United States Patent [19]

Gebelius

[11] 4,446,891
[45] May 8, 1984

[54] METHOD FOR REPAIRING AND/OR REINFORCING A PIPE SYSTEM, AND A DEVICE FOR UTILIZATION OF THE METHOD

[76] Inventor: Sven R. V. Gebelius, Drottningholmsvägen 195, Bromma, Sweden, S-161 36

[21] Appl. No.: 395,045
[22] PCT Filed: Nov. 4, 1981
[86] PCT No.: PCT/SE81/00325
   § 371 Date: Jun. 17, 1982
   § 102(e) Date: Jun. 17, 1982
[87] PCT Pub. No.: WO82/01489
   PCT Pub. Date: May 13, 1982

[30] Foreign Application Priority Data

Nov. 4, 1980 [SE] Sweden ............................... 8007743

[51] Int. Cl.³ .............................................. F16L 55/16
[52] U.S. Cl. ........................................ 138/97; 138/98; 29/421 E
[58] Field of Search .................... 138/89, 93, 95, 97, 138/98; 29/421 E, 523

[56] References Cited

U.S. PATENT DOCUMENTS

| | | | |
|---|---|---|---|
| 2,977,994 | 4/1961 | Xenis | 138/97 |
| 3,175,618 | 3/1965 | Lang et al. | 138/97 |
| 3,562,887 | 2/1971 | Schroeder et al. | 29/421 E |
| 3,590,877 | 7/1971 | Leopold | 138/89 |
| 3,781,966 | 1/1974 | Lieberman | 138/97 |
| 4,028,789 | 6/1977 | Loch | 138/97 |
| 4,140,126 | 2/1979 | Choudhury | 138/98 |

FOREIGN PATENT DOCUMENTS

| | | |
|---|---|---|
| 1271518 | 6/1968 | Fed. Rep. of Germany . |
| 106925 | 8/1979 | Japan ................................ 138/97 |
| 1166898 | 10/1969 | United Kingdom . |

*Primary Examiner*—John W. Shepperd
*Attorney, Agent, or Firm*—Holman & Stern

[57] ABSTRACT

A device and method for repairing and/or reinforcing a pipe system, according to which a tubular member (2) is inserted into a pipe (1) to be repaired, having sealed end portions and longitudinally extending impressions, or deformations (3, 3'), functioning to reduce the diameter of the tubular member (2) from its final diameter after use an explosive charge (4) with associated igniting device is arranged within the tubular member (2), whereby detonation of said explosive charge (4) causes expansion of the tubular member (2) to a surrounding contact position against the internal wall surface of the pipe (1). Advantageously the sealed end portions, or at least one of them, is opened and pressed into a sealing contact position against the surrounding pipe (1) by the force of the explosive charge.

6 Claims, 4 Drawing Figures

METHOD FOR REPAIRING AND/OR REINFORCING A PIPE SYSTEM, AND A DEVICE FOR UTILIZATION OF THE METHOD

CROSS REFERENCE TO RELATED APPLICATION

The invention of this application is disclosed in corresponding International Application No. PCT/SE81/00325 filed Nov. 4, 1981, the benefit of which is being claimed.

The present invention relates to a method for repairing and/or reinforcing a pipe system, and a device for utilization of the method.

BACKGROUND OF THE INVENTION

1. Field of The Invention

In pipe systems, e.g. located below the ground plane, formation of cracks or fractures can occur, caused by variations in temperature, movement in surrounding material, pressure changes and similar causes. When such pipe systems are located in a position difficult to access, repairs cause obvious problems, e.g. due to the fact that the pipe system must be freed from surrounding material in order to facilitate repair or exchange of a damaged part.

2. Description Of The Prior Art

In U.S. Pat. No. 2,977,994, a method is disclosed for repair of a pipe system, in which a flexible tubular hose is inserted into a pipe system in a deformed or compressed cross-sectional condition, retained in said deformed condition by means of releasable members, whereby the hose after insertion into the pipe system can be expanded to take up a mainly circular cross-sectional position, extending in contact with the internal wall surface of the pipe system.

The above discussed method of repairs makes it thus possible to arrange a flexible hose as an internal restricting surface in an existing pipe system, but for many applications it is desirable to provide an internal metallic surface, in order to obtain resistance against existing variations in temperature and pressure, as well as certain types of liquid and gaseous mediums, which are transported in the pipe system. For certain applications, repair can be performed with a pipe having a smaller diameter than the pipe to be repaired, and by insertion of same into an embraced relationship to the damaged pipe, but to facilitate this operation, the inserted pipe must have a considerably smaller cross-sectional area than the outer pipe, in order to facilitate insertion, and seals must be arranged at the outer end portions of the inserted pipe in contact with the surrounding outer pipe. Said reduction in area is an obvious disadvantage, and it is also extremely difficult to provide seals between the end portions of the inserted pipe and the surrounding pipe, whereby the method only occasionally can be used.

BRIEF SUMMARY OF THE INVENTION

The object of the present invention is to provide a method for repairing and/or reinforcing a pipe system, and a device for utilization of the method, which facilitates a sealing/reinforcing operation in an existing pipe system, and which produces a metallic internal wall surface in the pipe system in an extremely fast and simple fashion, completely without the sealing problems of the repair method discussed above on the basis of a pipe insertable into an existing pipe system.

DESCRIPTION OF THE DRAWINGS

An embodiment of a device for utilization of the method according to the present invention is more fully described below with reference to the accompanying drawing, intended to simplify the understanding of the method, but the embodiment shown should only be regarded as an example of an embodiment within the scope of the invention. In the drawing.

DETAILED DESCRIPTION

When a pipe breakage has occurred below a road surface, the damaged pipe can often not be reached without causing great difficulties for passing vehicles, and the work also involves risk for the workers. According to the present invention, a smaller portion of the pipe is made accessable at a suitable point, e.g. when a pipe extends below a road surface in a perpendicular relationship to same, access is advantageously obtained at one side of the road surface. The accessable portion of the pipe is thereafter opened, e.g. at a location of an existing joint, in order to facilitate insertion of a device according to the present invention in a direction towards, and past, the point where leakage or breakage has occurred, or to the point where the pipe is intended to be sealed or reinforced.

Figure 1:
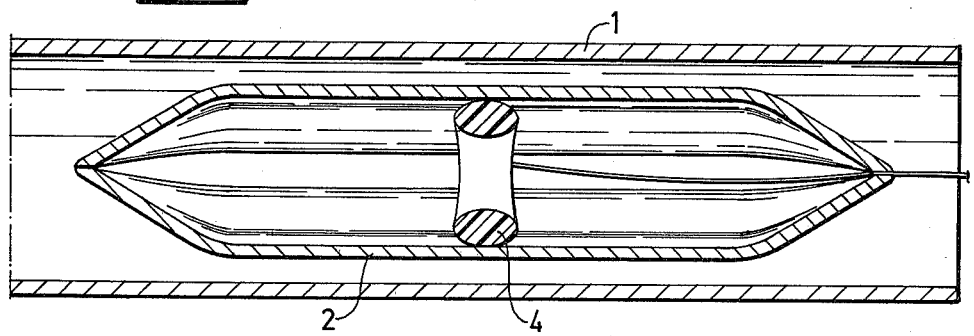
FIG. 1 is a longitudinal cross-sectional view of a pipe to be repaired, having a device according to the present invention inserted therein.
Figure 2:
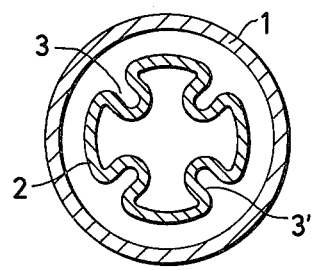
FIG. 2 is a cross-sectional view of the pipe shown in FIG. 1 with the inserted device, before repair and/or reinforcement has been performed to the surrounding pipe.

With reference to FIG. 1, a pipe 1 is shown which is intended to be repaired or reinforced. Into said pipe 1, a longitudinally extending tubular member 2 has been inserted in previously described fashion, comprising a tubular member originally having a preferably circular cross-section, and arranged with longitudinally extending impressions or deformations 3, 3' directed towards the central axis of the tubular member 2. An example of such a cross-sectional configuration is shown in FIG. 2. The end portions of the tubular member 2 are closed or sealed, and said sealed ends are preferably produced by compression of the end portions in a direction towards the central axis, thereby forming pointed end portions. Embraced within the tubular member 2, an explosive charge 4 is arranged with an associated igniting member, which igniting member facilitates detonation of the explosive charge 4 in a previously known manner, e.g. by electrical, mechanical or any other type of influence.

Figure 3:
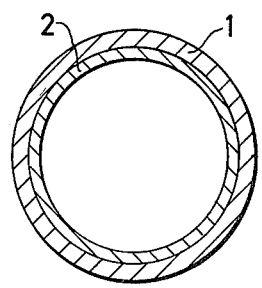
FIG. 3 is a view corresponding to FIG. 2, showing the pipe after repair and/or reinforcement has been accomplished.

When the tubular member 2 has been located in a position surrounded by the pipe 1, the igniting member is actuated, whereby the explosive charge 4 is detonated. Due to the pressure influence from the explosion, the tubular member 2 is first expanded between the ends, whereby complete contact is established against the internal wall surface of the surrounding pipe 1, and as a second step, the end portions of the tubular member 2 are also expanded, opened and pressed against the surrounding pipe 1, whereby the inserted tubular member 2 is opened therethrough to communicate with the interior of the repaired part of the pipe 1. Said expanded position is shown in FIG. 3. Since the end portions of the tubular member 2 preferably comprise pointed portions before expansion, formed by means of a compression or press operation, said end portions form a part in close contact with the pipe 1 after expansion, which prevents a gas or liquid flow between the tubular member 2 and the surrounding pipe 1. Furthermore, said tubular member 2 has a circumference in the unexpanded condition mainly corresponding to the internal circumference of the pipe 1, whereby said tubular member 2 mainly completely takes up a sealing contact position against the internal wall surface of the surrounding pipe 1 when expanded.

Figure 4:
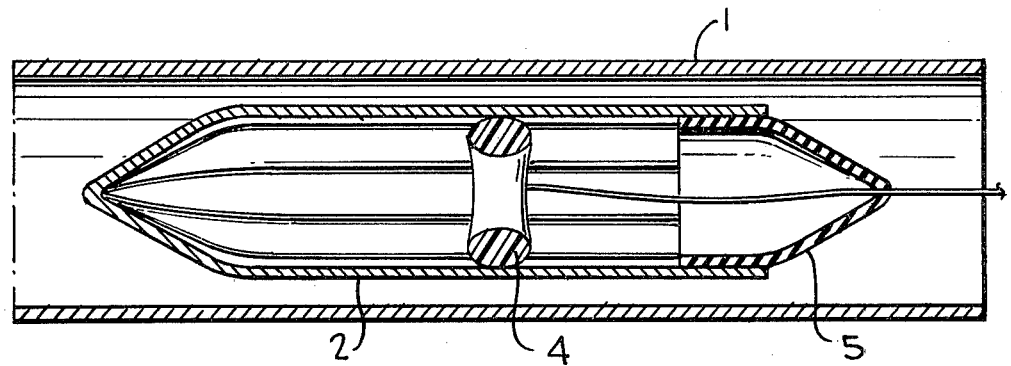
FIG. 4 is a cross-sectional view similar to FIG. 1, but showing an embodiment utilizing a different seal.

With reference to the above embodiment, the end portions of the tubular member 2 are adapted to be expanded and opened when the explosive charge 4 is detonated. However, in another embodiment of the invention only one end portion can be adapted to open and expand in the described fashion, and a different type of sealing member can be at the opposite end portion such as shown at 5 in FIG. 4, for example.

The latter sealing member could advantageously be arranged attachable together with the explosive charge 4 and associated igniting means, and for example manually removed, when the tubular member 2 has been expanded by means of the detonated explosive charge 4. Obviously, also other types of sealing end members can be used, e,g, manually removable end seals at both end portions, for applications where both end portions are accessable after insertion and expansion of the tubular member 2.

In the embodiment shown in the drawing, the tubular member 2 comprises a tubular part, having longitudinally extending and radially inwardly directed deformations or impressions 3, 3', arranged in a mainly cross-shaped configuration as viewed in cross-section, and arranged to reduce the diameter of an enclosing circle. It should be emphazised, that also other cross-sectional configurations obviously can be used, including deformations, impressions or grooves 3, 3', extending in longitudinal direction of the tubular member 2, and arranged to reduce the diameter of an enclosing circle. Provided that the tubular member 2 is arranged with such a cross-sectional configuration, that when expanded by means of explosive force from the explosive charge 4 it takes up a cross-sectional configuration having a larger diameter than the diameter for a circle enclosing the tubular member 2 before said expansion, the cross-sectional configuration is suited for utilization according to the method.

The tubular member further has a wall thickness predetermined in relation to the force of the explosive charge so that the circumference in the non-expanded condition is slightly increased by plastic deformation when expanded by the explosive force.

The embodiment shown and described is thus only intended to serve as an example of a basic embodiment within the scope of the method according to the present invention, and can thus be varied in a number of different ways with regard to the cross-sectional configuration of the tubular member 2, the method in which the end portions are sealed, and the method in which the explosive charge 4 is located in a position embraced by the tubular member 2.

I claim:

1. In a device for repairing and/or reinforcing a pipe wherein a tubular member enclosing an explosive charge is insertable into the pipe and arranged to expand the tubular member by means of explosive force into a contacting position against the surrounding pipe, the improvement comprising a plurality of longitudinally extending deformations in the tubular member adapted to give the tubular member a cross-sectional area of an enclosing circle having a diameter smaller than the internal diameter of said pipe so that said tubular member and deformations are expanded substantially radially by means of explosive force when the explosive charge is detonated into a substantially completely contacting position against the surrounding internal wall surface of the pipe, and at least the end portion of the tubular member intended to be first inserted into the pipe has a substantially pointed shape to serve as a guiding means for the tubular member during insertion and is adapted to open and expand by the explosive force into contact with the inner wall of the pipe after the portion of said tubular member other than said end portions has expanded into said contacting position.

2. Device according to claim 1, wherein the external circumference of said tubular member in the unexpanded condition substantially corresponds to the internal circumference of the pipe.

3. Device according to any one of claims 1 or 2, wherein at least one end portion of said tubular member is closed and sealed by means of a sealing member engaging against the tubular member.

4. Device as claimed in claim 1 wherein both ends of said tubular member are closed by a sealing member, and said sealing member comprises said pointed end portion integral with said tubular member adapted to open and expand by the force of the explosive charge into contact with the inner wall of the pipe after the portions of said tubular member other than said end portions has expanded into said contacting position.

5. Device according to any one of claims 1-2, wherein said tubular member has a predetermined wall thickness in relation to the force from the explosive charge so that the circumference in the non-expanded condition is slightly increased by plastic deformation when expanded due to said force.

6. Device according to any one of claims 1-2, wherein said deformations comprise a plurality of radially inwardly projecting ribs.

* * * * *